US011703698B1

(12) United States Patent
Kangas et al.

(10) Patent No.: US 11,703,698 B1
(45) Date of Patent: Jul. 18, 2023

(54) ADJUSTABLE LENS SYSTEMS

(71) Applicant: Apple Inc., Cupertino, CA (US)

(72) Inventors: Miikka M. Kangas, Campbell, CA (US); Eric G. Smith, Palo Alto, CA (US); Qing Liu, Mountain View, CA (US); Jeffrey G. Koller, San Jose, CA (US)

(73) Assignee: Apple Inc., Cupertino, CA (US)

( * ) Notice: Subject to any disclaimer, the term of this patent is extended or adjusted under 35 U.S.C. 154(b) by 451 days.

(21) Appl. No.: 16/554,136

(22) Filed: Aug. 28, 2019

Related U.S. Application Data

(60) Provisional application No. 62/725,174, filed on Aug. 30, 2018.

(51) Int. Cl.
  *G02F 1/01* (2006.01)
  *G02F 1/133* (2006.01)
  (Continued)

(52) U.S. Cl.
  CPC ............. *G02F 1/0123* (2013.01); *G01C 3/06* (2013.01); *G02C 7/083* (2013.01); *G02F 1/13306* (2013.01)

(58) Field of Classification Search
  CPC . G02C 7/00; G02C 7/02; G02C 7/081; G02C 7/083; G02C 7/085; G02C 7/088; G02C 7/024
  See application file for complete search history.

(56) References Cited

U.S. PATENT DOCUMENTS

| 5,434,599 A | 7/1995 | Hirai et al. |
| 6,011,653 A | 1/2000 | Karasawa |

(Continued)

FOREIGN PATENT DOCUMENTS

| JP | 2008203360 A | 9/2008 | |
| WO | WO-2017182906 A1 * | 10/2017 | ............. G02C 7/083 |
| WO | 2017216716 A1 | 12/2017 | |

OTHER PUBLICATIONS

Liwei Li et al., Near-Diffraction-Limited and Low-Haze Electro-Optical Tunable Liquid Crystal Lens with Floating Electrodes, Optical Society of America, Mar. 29, 2013, vol. 21, No. 7, Liquid Crystal Institute, Kent University, Kent, OH, United States.

(Continued)

*Primary Examiner* — Christopher Stanford
*Assistant Examiner* — Journey F Sumlar
(74) *Attorney, Agent, or Firm* — Treyz Law Group, P.C.; Kendall P. Woodruff (57) ABSTRACT

Eyeglasses may include one or more lenses and control circuitry that adjusts an optical power of the lenses. The control circuitry may be configured to determine a user's prescription and accommodation range during a vision characterization process. The vision characterization process may include adjusting the optical power of the lens until the user indicates that an object viewed through the lens is in focus. A distance sensor may measure the distance to the in-focus object. The control circuitry may calculate the user's prescription based on the optical power of the lens and the distance to the in-focus object. The control circuitry may adjust the optical power automatically or in response to user input. The object viewed through the lens may be an electronic device. The user may control the optical power of the lens and/or indicate when objects are in focus by providing input to the electronic device.

17 Claims, 7 Drawing Sheets

(51) Int. Cl.
G02C 7/08 (2006.01)
G01C 3/06 (2006.01)

(56) References Cited

U.S. PATENT DOCUMENTS

| | | |
|---|---|---|
| 6,295,044 B1 | 9/2001 | Geisow et al. |
| 8,248,576 B2 | 8/2012 | Chang |
| 8,885,139 B2 | 11/2014 | Peyghambarian et al. |
| 9,146,444 B2 | 9/2015 | Wada et al. |
| 10,288,904 B2 | 5/2019 | Yadin et al. |
| 10,345,656 B2 | 7/2019 | Li et al. |
| 2008/0316234 A1 | 12/2008 | Toriumi |
| 2010/0026920 A1 | 2/2010 | Kim et al. |
| 2015/0185503 A1* | 7/2015 | Tate ................ G02C 7/083 351/158 |
| 2016/0143528 A1 | 5/2016 | Wilf et al. |
| 2017/0068134 A1 | 3/2017 | Yadin et al. |
| 2017/0160440 A1* | 6/2017 | Yadin ............... G02C 7/083 |
| 2017/0160518 A1 | 6/2017 | Lanman et al. |
| 2017/0269453 A1 | 9/2017 | Galstian et al. |
| 2017/0353188 A1 | 12/2017 | Saeki et al. |
| 2018/0263488 A1* | 9/2018 | Pamplona ........... A61B 3/0041 |
| 2021/0141212 A1 | 5/2021 | Jacoby et al. |
| 2021/0149197 A1 | 5/2021 | Yadin et al. |

OTHER PUBLICATIONS

Brett E. Bagwell et al. Liquid Crystal Based Active Optics, Proceedings of SPIE—The International Society for Optical Engineering, Aug. 15-16, 2006, Novel Optical Systems Design and Optimization IX—San Diego, CA, United States.

* cited by examiner

$$D_{LENS} = \frac{1}{DISTANCE} + D_{PRESCRIPTION}$$

ADJUSTABLE LENS SYSTEMS

This application claims the benefit of provisional patent application No. 62/725,174, filed Aug. 30, 2018, which is hereby incorporated by reference herein in its entirety.

FIELD

This relates generally to optical systems, and, more particularly, to devices with tunable lenses.

BACKGROUND

Eyewear may include optical systems such as lenses. For example, eyewear such as a pair of glasses may include lenses that allow users to view the surrounding environment.

It can be challenging to design lenses that function properly for users having different prescriptions. A user may not know or remember his or her lens prescription, or the user may provide a prescription that is inaccurate.

SUMMARY

Eyeglasses may be worn by a user and may include one or more adjustable lenses each aligned with a respective one of a user's eyes. For example, a first adjustable lens may align with the user's left eye and a second adjustable lens may align with the user's right eye. Each of the first and second adjustable lenses may include one or more liquid crystal cells or other voltage-modulated optical material. Each liquid crystal cell may include a layer of liquid crystal material interposed between transparent substrates. Control circuitry may adjust the optical power of the lens by applying control signals to an array of electrodes in the liquid crystal cell to adjust a phase profile of the liquid crystal material.

The control circuitry may be configured to determine a user's prescription and accommodation range during a vision characterization process. The vision characterization process may include adjusting the optical power of the lens until the user indicates that an object viewed through the lens is in focus. A distance sensor may measure the distance to the in-focus object. The control circuitry may calculate the user's prescription based on the optical power of the lens and the distance to the in-focus object. During vision characterization operations, control circuitry may adjust the optical power automatically or in response to user input.

The object viewed through the lens may be an electronic device. The user may control the optical power of the lens and/or indicate when objects are in focus by providing input to the electronic device. For example, the electronic device may be an electronic wrist watch having a rotatable watch crown, and the user may control the optical power of the lens and/or indicate whether objects are in focus by rotating the watch crown. In another illustrative example, the electronic device may be having a touch sensor and a display that displays user interface elements, and the user may control the optical power of the lens and/or indicate whether objects are in focus by providing touch input to control the user interface elements.

DETAILED DESCRIPTION

Figure 1:
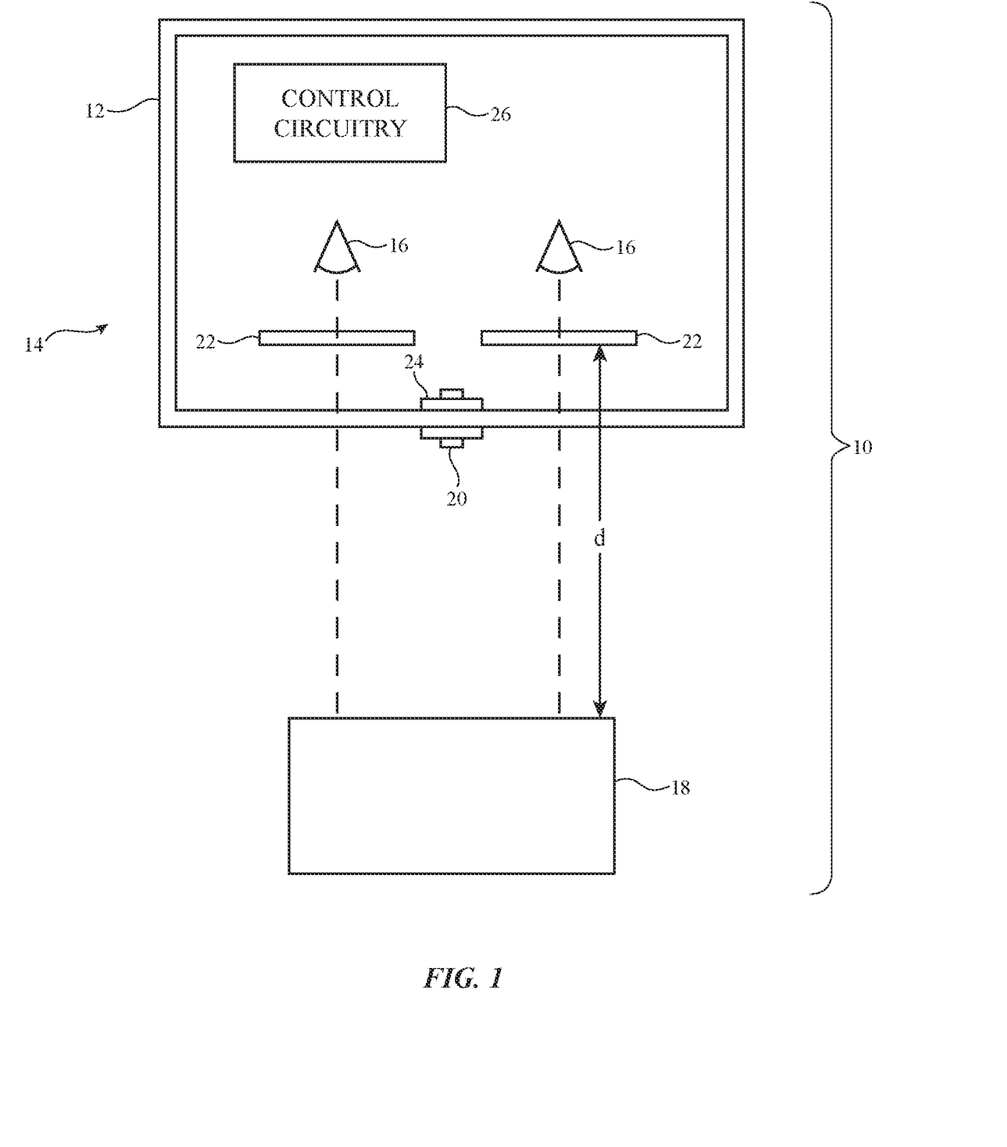
FIG. 1 is a diagram of illustrative system that includes eyeglasses with adjustable lenses in accordance with an embodiment.

An illustrative system having a device with one or more electrically adjustable optical elements is shown in FIG. 1. System 10 may include a head-mounted device such as eyeglasses 14 (sometimes referred to as glasses 14). Glasses 14 may include one or more optical systems such as adjustable lens components 22 mounted in a support structure such as support structure 12. Structure 12 may have the shape of a pair of eyeglasses (e.g., supporting frames), may form a housing having a helmet shape, or may have other configurations to help in mounting and securing the components of glasses 14 on the head of a user.

Adjustable lens components 22 may form lenses that allow a viewer (e.g., user 16) to view external objects such as object 18 in the surrounding environment. Glasses 14 may include one or more adjustable lens components 22, each aligned with a respective one of a user's eyes. As an example, lens components 22 may include a left lens 22 aligned with a viewer's left eye and may include a right lens 22 aligned with a viewer's right eye. This is, however, merely illustrative. If desired, glasses 14 may include adjustable lens components 22 for a single eye.

Adjustable lenses 22 may be corrective lenses that correct for vision defects. For example, user 16 may have eyes with vision defects such as myopia, hyperopia, presbyopia, astigmatism, and/or other vision defects. Corrective lenses such as lenses 22 may be configured to correct for these vision defects. Lenses 22 may be adjustable to accommodate users with different vision defects and/or to accommodate different focal ranges. For example, lenses 22 may have a first set of optical characteristics for a first user having a first prescription and a second set of optical characteristics for a second user having a second prescription. Glasses 14 may be used purely for vision correction (e.g., glasses 14 may be a pair of spectacles) or glasses 14 may include displays that display virtual reality or augmented reality content (e.g., glasses 14 may be a head-mounted display). In virtual reality or augmented reality systems, adjustable lens components 22 may be used to move content between focal planes. Arrangements in which glasses 14 are spectacles that do not include displays are sometimes described herein as an illustrative example.

Glasses 14 may include control circuitry 26. Control circuitry 26 may include processing circuitry such as microprocessors, digital signal processors, microcontrollers, baseband processors, image processors, application-specific integrated circuits with processing circuitry, and/or other processing circuitry and may include random-access memory, read-only memory, flash storage, hard disk storage, and/or other storage (e.g., a non-transitory storage media for storing computer instructions for software that runs on control circuitry 26).

Control circuitry 26 may control the operation of optical elements such as adjustable lens components 22. Adjustable lens components 22, which may sometimes be referred to as adjustable lenses, adjustable lens systems, adjustable optical systems, adjustable lens devices, tunable lenses, etc., may contain electrically adjustable material such as liquid crystal material, or other electrically modulated material that may be adjusted to produce customized lenses. Each of components 22 may contain an array of electrodes that apply electric fields to portions of a layer of liquid crystal material or other voltage-modulated optical material with an electrically adjustable index of refraction (sometimes referred to as an adjustable lens power or adjustable phase profile). By adjusting the voltages of signals applied to the electrodes, the index of refraction profile of components 22 may be dynamically adjusted. This allows the size, shape, and location of the lenses formed within components 22 to be adjusted.

Glasses 14 may include input-output circuitry such as eye state sensors, range finders disposed to measure the distance to external object 18, touch sensors, buttons, microphones to gather voice input and other input, sensors, and other devices that gather input (e.g., user input from viewer 16) and may include light-emitting diodes, displays, speakers, and other devices for providing output (e.g., output for viewer 16). If desired, sensors such as an accelerometer, compass, an ambient light sensor or other light detector, a proximity sensor, a scanning laser system, and other sensors may be used in gathering input during use of glasses 14.

Glasses 14 may, if desired, include wireless circuitry and/or other circuitry to support communications with a computer or other external equipment. For example, control circuitry 26 may include wireless communications circuitry (e.g., a radio-frequency transceiver) that exchanges wireless signals with external electronic devices. In some arrangements, object 18 is an electronic device and glasses 14 may send signals to and/or receive signals from the electronic device using wireless communications circuitry.

Sensors in glasses 14 may include one or more digital image sensors such as camera 24. Cameras such as camera 24 may be an inward-facing camera that captures images of the user's eyes and/or may be an outward-facing camera that captures images of the user's environment. As an example, camera 24 may be used by control circuitry 26 to gather images of the pupils and other portions of the eyes of the viewer. The locations of the viewer's pupils and the locations of the viewer's pupils relative to the rest of the viewer's eyes may be used to determine the locations of the centers of the viewer's eyes (i.e., the centers of the user's pupils) and the direction of view (gaze direction) of the viewer's eyes.

Glasses 14 may include sensors such as depth sensor 20 for measuring the distance d to external objects such as external object 18. Depth sensor 20 may be a light-based proximity sensor, a time-of-flight camera sensor, a camera-based depth sensor using parallax, a structured light depth sensor (e.g., having an emitter that emits beams of light in a grid, a random dot array, or other pattern, and having an image sensor that generates depth maps based on the resulting spots of light produced on target objects), a sensor that gathers three-dimensional depth information using a pair of stereoscopic image sensors, a lidar (light detection and ranging) sensor, a radar sensor, or other suitable sensor.

If desired, control circuitry 26 may operate depth sensor 20 based on information from inward-facing camera 24. For example, control circuitry 26 may use data from camera 24 to determine which external object 18 the user is looking at and may use depth sensor 20 to measure the distance to that object 18. Distance information gathered by depth sensor 20 may be used to adjust the optical power of lens components 22. For example, control circuitry 26 may adjust the focal length of lens components 22 based on the distance d to object 18 so that object 18 is in focus for the user. As the user's gaze shifts to different objects at different distances, control circuitry 26 may actively adjust the optical power of lens components 22 so that objects at different distances remain in focus.

In addition to controlling lenses 22 to focus on objects at different distances, control circuitry 26 may adjust the optical power of lenses 22 to correct for vision defects such as myopia, hyperopia, presbyopia, astigmatism, and/or other vision defects. To correct such vision defects, control circuitry 26 may obtain a user's prescription and accommodation range. Such information may be provided directly to glasses 14 by a user, may be collected from another electronic device in which a user's health data is stored, and/or may be determined using glasses 14.

Control circuitry 26 may be configured to determine a user's prescription and/or accommodation range using a vision characterization process. The vision characterization process may be carried out using glasses 14 and an external object such as object 18. Vision characterization operations may include, for example, having the user view object 18 through lens 22 and receiving user input indicating when object 18 is in focus. The optical power of lens 22 and the distance to the in-focus object may be used to determine the user's prescription. Different properties of system 10 may be varied until the user's prescription and/or accommodation range is determined. For example, the optical power of lenses 22 may be varied, the distance d between glasses 14 and object 18 may be varied, and/or other properties of system 10 may be varied while user input is gathered. The optical power of lens 22 and the distance to the in-focus objects may be used to determine the user's prescription and accommodation range. Once a user's prescription and accommodation range are known, control circuitry 26 may operate lenses 22 in accordance with the user's prescription and accommodation range (e.g., to correct for vision defects and provide an appropriate amount of accommodation for the user).

In some arrangements, the vision characterization process may be conducted for both eyes at the same time. In other arrangements, the vision characterization process may be conducted separately for each eye to obtain the prescription and/or accommodation range of each individual eye. This may be achieved by having the user cover the eye that is not being characterized and/or by using glasses 14 to block the eye that is not being characterized.

In some arrangements, external object 18 may be an object without electronics. In other arrangements, external object 18 is an electronic device that is used in conjunction with glasses 14 during vision characterization operations. Arrangements in which external object 18 is an electronic device are sometimes described herein as an illustrative example.

Figure 2:
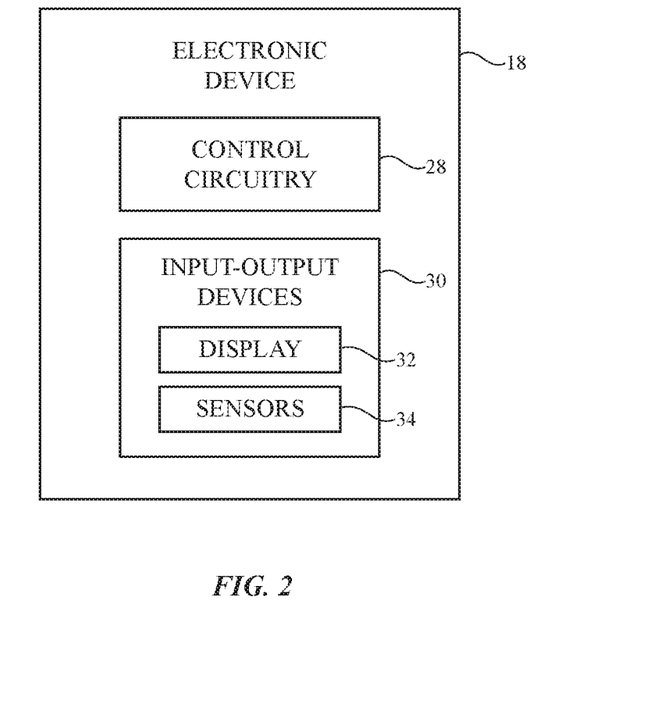
FIG. 2 is a diagram of an illustrative electronic device that may be used in a system of the type described in connection with FIG. 1 in accordance with an embodiment.

An illustrative electronic device of the type that may be used in system 10 to facilitate characterizing a user's vision is shown in FIG. 2. As shown in FIG. 2, electronic device 18 may have control circuitry 28. Control circuitry 28 may include storage and processing circuitry for supporting the operation of device 18. The storage and processing circuitry may include storage such as hard disk drive storage, non-volatile memory (e.g., flash memory or other electrically-programmable-read-only memory configured to form a solid state drive), volatile memory (e.g., static or dynamic random-access-memory), etc. Processing circuitry in control circuitry 28 may be used to control the operation of device 18. The processing circuitry may be based on one or more microprocessors, microcontrollers, digital signal processors, baseband processors, power management units, audio chips, application specific integrated circuits, etc.

Device 18 may include input-output circuitry such as cellular telephone transceiver circuitry, wireless local area network transceiver circuitry, and other communications circuitry. Input-output circuitry in device 18 such as input-output devices 30 may be used to allow data to be supplied to device 18 and to allow data to be provided from device 18 to external devices. Input-output devices 30 may include buttons, joysticks, scrolling wheels, touch pads, key pads, keyboards, speakers, tone generators, vibrators (e.g., piezoelectric vibrating components, etc.), light-emitting diodes and other status indicators, data ports, and other circuitry.

Input-output devices 30 may include one or more displays such as display 32. Display 32 may be a touch screen display that includes a touch sensor for gathering touch input from a user or display 32 may be insensitive to touch. A touch sensor for display 32 may be based on an array of capacitive touch sensor electrodes, acoustic touch sensor structures, resistive touch components, force-based touch sensor structures, a light-based touch sensor, or other suitable touch sensor arrangements. If desired, display 32 may include actuators to provide haptic feedback for a user.

Input-output devices 30 may include sensors 34. Sensors 34 may include strain gauge sensors, proximity sensors, ambient light sensors, touch sensors, force sensors, temperature sensors, pressure sensors, magnetic sensors, accelerometers, gyroscopes and other sensors for measuring orientation (e.g., position sensors, orientation sensors), microelectromechanical systems sensors, and other sensors. Sensors 34 may be light-based sensors (e.g., proximity sensors or other sensors that emit and/or detect light), capacitive sensors (e.g., sensors that measure force and/or touch events using capacitance measurements). Strain gauges, piezoelectric elements, capacitive sensors, and other sensors may be used in measuring applied force and can therefore be used to gather input from a user's fingers or other external source of pressure. Capacitive touch sensors may make capacitance measurements to detect the position of a user's finger(s). If desired, sensors 34 may include microphones to gather audio signals. Sensors 34 may be incorporated into display 32. For example, display 32 may have an array of light-emitting diodes and sensors 34 and/or actuator components may be incorporated into the array to provide display 32 with the ability to sense user input and provide haptic feedback in addition to the ability to display images for the user.

Sensor(s) 34, which may sometimes be referred to as sensor circuitry, may include visible light cameras and/or infrared light cameras. To capture depth information, sensors 34 in input-output devices 30 may include one or more depth sensors such as light-based proximity sensors, time-of-flight camera sensors, camera-based depth sensors using parallax, structured light depth sensors (e.g., having an emitter that emits beams of light in a grid, a random dot array, or other pattern, and having an image sensor that generates depth maps based on the resulting spots of light produced on target objects), sensors that gather three-dimensional depth information using a pair of stereoscopic image sensors, lidar (light detection and ranging) sensors, radar sensors, and/or other suitable sensors.

Control circuitry 28 may be used to run software on device 18 such as operating system code and applications. During operation of device 18, the software running on control circuitry 28 may be used in gathering user input and making measurements using sensors 34 and may be used in providing output to a user with display 32 and other output resources in input-output devices 30.

Device 18 may be a cellular telephone, a tablet computer, a laptop computer, a wrist watch device, or other portable electronic device and/or may include or be based on a desktop computer, set-top box, or other electronic equipment. Illustrative configurations in which device 18 is a portable device such as a wrist watch device, a cellular telephone, or laptop computer may sometimes be described herein as an example.

Figure 3:
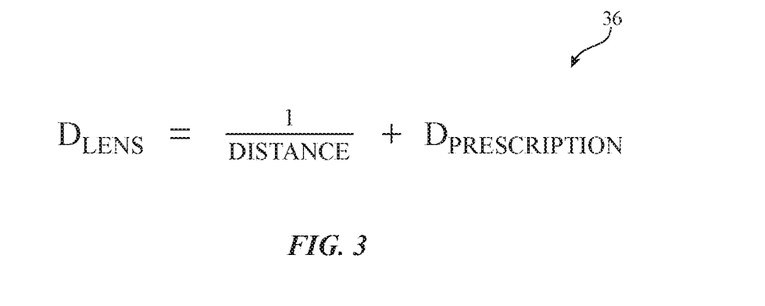
FIG. 3 is an equation describing a relationship between the optical power of a lens, the distance to an in-focus object, and a user's prescription in accordance with an embodiment.

FIG. 3 is an equation for determining the diopters needed for a lens to bring an object at a given distance into focus for a user with vision defects. In equation 36 of FIG. 3, $D_{LENS}$ corresponds the focal power of lens 22 in diopters, $_{DISTANCE}$ corresponds to the distance in meters to the object that the user is focusing on, and $D_{PRESCRIPTION}$ corresponds to the user's prescription in diopters. System 10 of FIG. 1 may conduct a vision characterization process to determine $D_{PRESCRIPTION}$ for a user. In the vision characterization process, $D_{LENS}$ and $_{DISTANCE}$ of equation 36 of FIG. 3 may be known and/or measureable, allowing system 10 (e.g., control circuitry 26 of glasses 14 and/or control circuitry 28 of electronic device 18) to solve for $D_{PRESCRIPTION}$.

It should be understood that equation 36 of FIG. 3 is merely an illustrative example of how system 10 might determine a user's prescription. If desired, system 10 may use other methods or formulas to determine a user's prescription based on user input and distance measurements. In some arrangements, system 10 may not explicitly calculate a user's prescription but may use user input and distance measurements to determine appropriate operating parameters for glasses 14 that account for the user's prescription (e.g., may determine appropriate settings for glasses 14 that correct for any deficiencies in the user's vision).

Vision characterization operations may be conducted entirely by glasses 14 (e.g., using control circuitry 26 and depth sensor 20), may be conducted entirely by electronic device 18 (e.g., using control circuitry 28 and sensors 34), or may be conducted by both glasses 14 and electronic device 18. Glasses 14 and electronic device 18 may include wireless communications circuitry such as radio-frequency transceiver circuitry for handling various radio-frequency communications bands. For example, control circuitry 26 and 28 may be configured to communicate with each other using wireless local area network protocols (e.g., IEEE 802.11 protocols—sometimes referred to as WiFi®), protocols for other short-range wireless communications links such as the Bluetooth® protocol, cellular telephone protocols, MIMO protocols, antenna diversity protocols, satellite navigation system protocols, millimeter wave communications protocols, IEEE 802.15.4 ultra-wideband communications protocols, etc.

Figure 4:
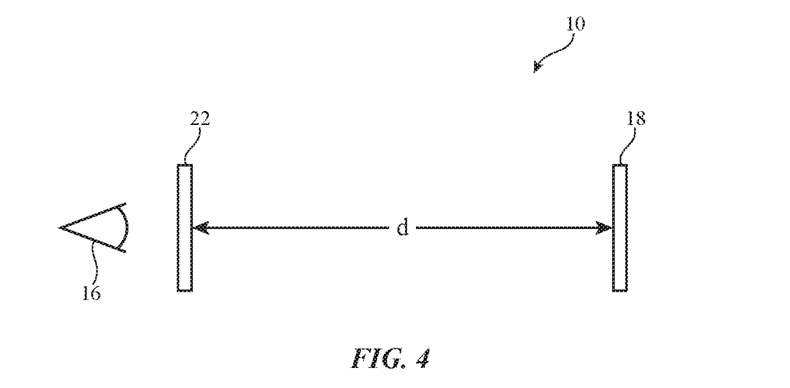
FIG. 4 is a diagram of an illustrative system showing how a user may view an object through a lens during a vision characterization process in accordance with an embodiment.

FIG. 4 is a diagram illustrating how system 10 may conduct a vision characterization process to solve for $D_{PRESCRIPTION}$ of equation 36 in FIG. 3. As shown in FIG. 4, user 16 may view external objects such as object 18 through lens 22. Object 18 may be an object without electronics or may be an electronic device of the type shown in FIG. 2. In arrangements where object 18 is an electronic device, user 16 may provide input to device 18 and/or may receive output from device 18. If desired, display 32 of device 18 may display an image during vision characterization operations. During vision characterization operations, the lens power of lens 22 and/or distance d between lens 22 and object 18 may be adjusted until object 18 is in focus. Once object 18 is in focus, control circuitry 26 (and/or control circuitry 28) may use the optical power of lens 22 (corresponding to $D_{LENS}$ in equation 36 in FIG. 3) and the distance d (corresponding to $D_{DISTANCE}$ in equation 36 in FIG. 3) to solve for $D_{PRESCRIPTION}$ in equation 36 in FIG. 3.

If desired, the resolution or amount of blurring in images on display 32 of electronic device 18 may be adjusted to determine a user's prescription. For example, control circuitry 28 may adjust the resolution of an image on display 32 in a controlled fashion until the user provides feedback indicating when the image on display 32 is out of focus. When the resolution of an image on display 32 exceeds the resolution of the human retina, the change in resolution of the image on display 32 will not be noticeable to the user. When the resolution of the image on display 32 falls below the resolution of the human retina, the user will notice blurring and can provide appropriate feedback. This information may in turn be used to determine the user's prescription.

In one illustrative arrangement, control circuitry 26 of glasses 14 may cycle through different lens powers for lens 22 automatically (e.g., without requiring user input) until user 16 provides input indicating that object 18 is in focus. For example, control circuitry 26 may continuously adjust the optical power of lens 22 across a range of optical powers (e.g., between maximum and minimum optical powers such as 5D to −5D, or any other suitable range of optical powers). As the optical power of lens 22 changes, object 18 may come in and out of the user's focus. Control circuitry 26 may cycle through one or more ranges of lens powers at one or more speeds. In one illustrative example, control circuitry 26 cycles through a first range of lens powers at a first speed until a first user input is received. Control circuitry 26 may then cycle through a second range of lens powers at a second speed until a second user input is received. If desired, the second range may be smaller than the first range and the second speed may be slower than the first speed.

When lens 22 reaches an optical power that brings object 18 into focus for the user, the user may provide input to glasses 14 and/or to electronic device 18 to indicate when object 18 is in focus. The user input may be touch input, voice input, motion input, button press input, or any other suitable type of user input. If desired, control circuitry 26 may stop cycling through different lens powers and/or may begin cycling through a different range of lens powers upon receiving user input indicating that object 18 is in focus. When object 18 is in focus, equation 36 of FIG. 3 may be used to determine the user's prescription. The distance d to object 18 may be measured using depth sensor 20 of glasses 14 and/or using a depth sensor in sensors 34 of device 18. The lens power of lens component 22 when object 18 is in focus corresponds to $D_{LENS}$ in equation 36 of FIG. 3, and the distance d to the in-focus object 18 corresponds to $D_{DISTANCE}$ in equation 36 of FIG. 3. Using these two values, control circuitry 26 may solve for $D_{PRESCRIPTION}$ of equation 36 in FIG. 3.

In another illustrative arrangement, control circuitry 26 may adjust the lens power of lens component 22 in response to user input. For example, a user may provide input to glasses 14 and/or electronic device 18 to adjust the lens power of lens 22 until object 18 is in focus. A user may provide a first user input to adjust the optical power of lens 22 and may provide a second user input to indicate when object 18 comes into focus. For example, a user may turn a watch crown, move a slider on a touch screen, provide touch input to a touch pad, or provide other suitable input (e.g., touch input, voice input, motion input, button press input, etc.) to adjust the lens power until object 18 is in focus. When an object is in focus, the user may stop adjusting the lens power of lens 22. If no user input is received for a given period of time, control circuitry 26 may conclude that object 18 is in focus for the user. This is, however, merely illustrative. If desired, user 16 may provide active user input (e.g., touch input, voice input, motion input, button press input, etc.) indicating that object 18 is in focus. Wireless communications circuitry in device 18 may be used to convey the user input (e.g., the first user input that controls the optical power of lens 22 and the second user input that indicates object 18 is in focus) to glasses 14. When object 18 is in focus, equation 36 of FIG. 3 may be used to determine the user's prescription. The distance d to object 18 may be measured using depth sensor 20 of glasses 14 and/or using a depth sensor in sensors 34 of device 18. The optical power of lens 22 when object 18 is in focus corresponds to $D_{LENS}$ in equation 36 of FIG. 3 and the distance d to the in-focus object 18 corresponds to $D_{DISTANCE}$ in equation 36 of FIG. 3. Using these two values, control circuitry 26 may solve for $D_{PRESCRIPTION}$ of equation 36 in FIG. 3.

In another illustrative arrangement, the distance d between object 18 and lens 22 may be varied until object 18 comes into focus. For example, user 16 may move object 18 back and forth until object 18 is in focus. As distance d changes, the lens power of lens 22 may remain constant or may be varied. The user may provide input indicating when object 18 is in focus (e.g., by holding object 18 at a given distance for a given period of time or by providing other suitable input to device 18 and/or glasses 14). When the user indicates that object 18 is in focus, control circuitry 26 may use the lens power of lens 22 (corresponding to $D_{LENS}$ in equation 36 of FIG. 3) and distance d to in-focus object 18 (corresponding to $D_{DISTANCE}$ in equation 36 of FIG. 3) to solve for $D_{PRESCRIPTION}$ in equation 36 of FIG. 3. The distance d to object 18 may be measured using depth sensor 20 of glasses 14 and/or using a depth sensor in sensors 34 of device 18.

In another illustrative arrangement, the user may look around at different objects 18 at different distances d and may provide suitable input when the object is in focus. In other words, instead of changing distance d by moving object 18, distance d may be changed by the user simply adjusting his or her gaze to an in-focus object in the user's environment. The user may provide suitable input to indicate when his or her gaze has found an object in focus (e.g., by holding his or her gaze on the object for a given period of time or by providing other suitable input to device 18 and/or glasses 14). When the user indicates that object 18 is in focus, control circuitry 26 may use the lens power of lens 22 (corresponding to $D_{LENS}$ in equation 36 of FIG. 3) and distance d to in-focus object 18 (corresponding to $_{DISTANCE}$ in equation 36 of FIG. 3) to solve for $D_{PRESCRIPTION}$ in equation 36 of FIG. 3. The distance d to object 18 may be measured using depth sensor 20 of glasses 14 and/or using a depth sensor in sensors 34 of device 18.

Figure 5:
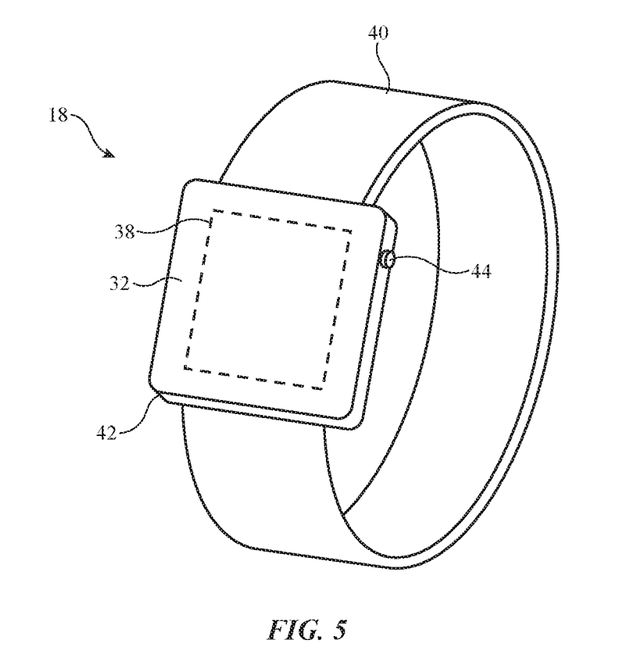
FIG. 5 is a perspective view of an illustrative electronic device having input-output devices such as a display and rotatable watch crown that may be used in a vision characterization process in accordance with an embodiment.
Figure 6:
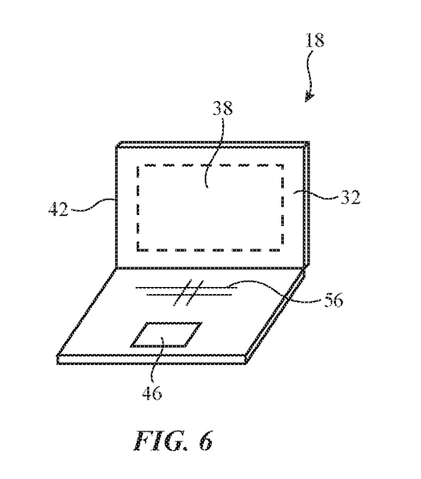
FIG. 6 is a perspective view of an illustrative electronic device having input-output devices such as a display, a keyboard, and a touch pad that may be used in a vision characterization process in accordance with an embodiment.
Figure 7:
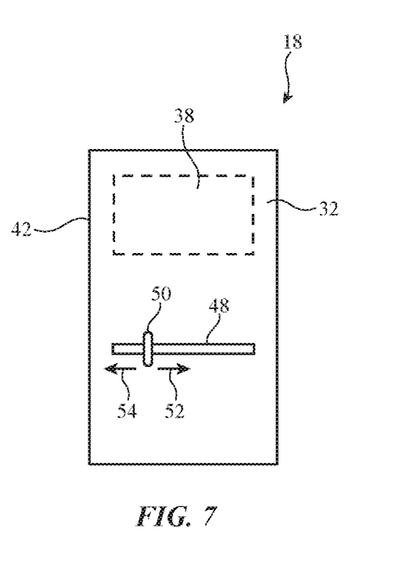
FIG. 7 is a front view of an illustrative electronic device having input-output devices such as a display and touch sensor that may be used in a vision characterization process in accordance with an embodiment.

FIGS. 5, 6, and 7 are illustrative types of electronic devices 18 that may be used during vision characterization operations.

In the example of FIG. 5, electronic device 18 is a wrist watch having a housing 42 and a band 40 that attaches housing 42 to a user's wrist. Electronic device 18 may have input-output devices such as touch screen display 32 and crown 44. During vision characterization operations, display 32 may display image 38. User 16 (FIG. 4) may view image 38 through lens 22 of glasses 14 and may provide input to glasses 14 and/or electronic device 18. For example, a user may provide input by rotating and/or pressing crown 44, touching display 32, and/or providing other suitable input.

In one illustrative arrangement, a user may rotate crown 44 to adjust the optical power, cylindrical correction, or higher order corrections of lens 22. Wireless circuitry in device 18 may send wireless signals to glasses 14 that cause control circuitry 26 to adjust the optical power of lens 22 in accordance with the rotation of crown 44. Rotation of crown 44 in one direction, for example, may result in an increase in optical power of lens 22, whereas rotation of crown 44 in the opposite direction may result in a decrease in optical power of lens 22. For aberrations such as cylindrical, trefoil, coma, and higher order aberrations, crown 44 may be used to adjust the power of lens 22 and/or may be used to adjust the orientation angle of the aberration. Pressing on crown 44 and/or providing other user input may be used to switch the adjustment mode of crown 44 (e.g., to change the effect that rotation of crown 44 has on lens 44). For example, the user may press on crown 44 to change between an aberration selection mode, a phase selection mode, an orientation angle adjustment mode, a fine tuning mode, or other adjustment mode. The speed at which control circuitry 26 adjusts the optical power of lens 22 may be based on the speed at which the user rotates crown 44 (e.g., slower rotation of crown 44 may result in slower and/or finer adjustment of lens 22, and vice versa).

As the optical power of lens 22 changes in response to rotation of crown 44, image 38 may go in and out of focus for the user. When image 38 comes into focus, the user may provide input to device 18 by pressing crown 44 inward (e.g., towards housing 42) or providing other suitable input to device 18 and/or glasses 14. Wireless circuitry in device 18 may send wireless signals to glasses 14 to communicate the user's input to device 18. When the user indicates that object 18 is in focus, control circuitry 26 and/or control circuitry 28 may use the lens power of lens 22 (corresponding to $D_{LENS}$ in equation 36 of FIG. 3) and distance d to in-focus object 18 (corresponding to $_{DISTANCE}$ in equation 36 of FIG. 3) to solve for $D_{PRESCRIPTION}$ in equation 36 of FIG. 3. The distance d to object 18 may be measured using depth sensor 20 of glasses 14 and/or using a depth sensor in sensors 34 of device 18.

If desired, other types of input (e.g., touch input, voice input, motion input, button press input, etc.) to electronic device 18 of FIG. 5 and/or glasses 14 may be used to adjust the optical power of lens 22 and/or to indicate whether an object is in focus. Providing input to watch crown 44 is merely illustrative.

In the example of FIG. 6, electronic device 18 is a laptop computer having a housing 42 with upper and lower housing portions coupled by a hinge. Electronic device 18 may have input-output devices such as display 32, keyboard 56, and touch pad 46. During vision characterization operations, display 32 may display image 38. User 16 (FIG. 4) may view image 38 through lens 22 of glasses 14 and may provide input to glasses 14 and/or electronic device 18. For example, a user may provide input to keyboard 56 and/or touch pad 46.

In one illustrative arrangement, a user may slide one or more fingers on touch pad 56 to adjust the optical power of lens 22. Wireless circuitry in device 18 may send wireless signals to glasses 14 that cause control circuitry 26 to adjust the optical power of lens 22 in accordance with the touch input on touch pad 46. Sliding one or more fingers on touch pad 46 in one direction, for example, may result in an increase in optical power of lens 22, whereas sliding one or more fingers on touch pad 46 in the opposite direction may result in a decrease in optical power of lens 22. The speed at which control circuitry 26 adjusts the optical power of lens 22 may be based on the speed at which the user slides his or her finger(s) on touch pad 46 (e.g., slower sliding motion on touch pad 46 may result in slower and/or finer adjustment of lens 22, and vice versa). If desired, other types of touch input (e.g., clicking, pressing, swiping, pinching, etc.) may be provided to touch pad 46. The use of sliding fingers is merely illustrative.

As the optical power of lens 22 changes in response to touch input on touch pad 46, image 38 may go in and out of focus for the user. When image 38 comes into focus, the user may provide input to device 18 by pressing down (e.g., clicking) on touch pad 46 or providing other suitable input to device 18 and/or glasses 14. Wireless circuitry in device 18 may send wireless signals to glasses 14 to communicate the user's input to device 18. When the user indicates that object 18 is in focus, control circuitry 26 and/or control circuitry 28 may use the lens power of lens 22 (corresponding to $D_{LENS}$ in equation 36 of FIG. 3) and distance d to in-focus object 18 (corresponding to $_{DISTANCE}$ in equation 36 of FIG. 3) to solve for $D_{PRESCRIPTION}$ in equation 36 of FIG. 3. The distance d to object 18 may be measured using depth sensor 20 of glasses 14 and/or using a depth sensor in sensors 34 of device 18.

If desired, other types of input (e.g., touch input, voice input, motion input, button press input, etc.) to electronic device 18 of FIG. 6 and/or glasses 14 may be used to adjust the optical power of lens 22 and/or to indicate when an object is in focus. Providing input to touch pad 46 is merely illustrative.

In the example of FIG. 7, electronic device 18 is a cellular telephone or tablet computer having a housing 42. Electronic device 18 may have input-output devices such as touch screen display 32. During vision characterization operations, display 32 may display image 38. User 16 (FIG. 4) may view image 38 through lens 22 of glasses 14 and may provide input to glasses 14 and/or electronic device 18. For example, a user may provide input to touch screen display 32.

In one illustrative arrangement, display 32 may display images such as user interface elements that allow a user to provide input to device 18 and/or glasses 14. For example, display 32 may display user interface elements such as slider 50 and bar 48. A user may move slider 50 along bar 48 to adjust the optical power of lens 22. Wireless circuitry in device 18 may send wireless signals to glasses 14 that cause control circuitry 26 to adjust the optical power of lens 22 in accordance with movement and position of slider 50 on bar 48. Moving slider 50 in direction 52, for example, may result in an increase in optical power of lens 22, whereas moving slider 50 in direction 54 may result in a decrease in optical power of lens 22. The speed at which control circuitry 26 adjusts the optical power of lens 22 may be based on the speed at which the user moves slider 50 (e.g., slower movement of slider 50 may result in slower and/or finer adjustment of lens 22, and vice versa). If desired, other types of user interface elements and/or other types of touch input (e.g., clicking, pressing, swiping, pinching, etc.) may be used during vision characterization operations. The use of slider 50 and bar 48 on display 32 is merely illustrative.

As the optical power of lens 22 changes in response to touch input on display 32, image 38 may go in and out of focus for the user. When image 38 comes into focus, the user may provide input to device 18 by leaving slider 50 in a given position for a period of time and/or by providing other suitable input to device 18 and/or glasses 14. Wireless circuitry in device 18 may send wireless signals to glasses 14 to communicate the user's input to device 18. When the user indicates that object 18 is in focus, control circuitry 26 and/or control circuitry 28 may use the lens power of lens 22 (corresponding to $D_{LENS}$ in equation 36 of FIG. 3) and distanced to in-focus object 18 (corresponding to $_{DISTANCE}$ in equation 36 of FIG. 3) to solve for $D_{PRESCRIPTION}$ in equation 36 of FIG. 3. The distance d to object 18 may be measured using depth sensor 20 of glasses 14 and/or using a depth sensor in sensors 34 of device 18.

If desired, other types of input (e.g., touch input, voice input, motion input, button press input, etc.) to electronic device 18 of FIG. 7 and/or glasses 14 may be used to adjust the optical power of lens 22 and/or to indicate when an object is in focus. Providing input to display 32 is merely illustrative.

In addition to determining a user's prescription (e.g., $D_{PRESCRIPTION}$ in equation 36 of FIG. 3), which may include cylindrical, trefoil, coma, higher order aberrations (as examples), system 10 (e.g., control circuitry 26 and/or control circuitry 28) may be configured to determine a user's accommodation range. Accommodation refers to the process by which the eye changes optical power to maintain focus on an object as its distance varies. Accommodation range refers to the range of distances over which an object can be accurately focused on the retina by accommodation of the eye. The accommodation range is characterized by a near point and a far point. The near point is the minimum distance at which the eye can maintain focus on an object, and the far point is the maximum distance at which the eye can maintain focus on an object. Some users may have a full accommodation range, whereas other users may have little or no accommodation range. When a user's accommodation range is known, control circuitry 26 may operate lens 22 in accordance with the user's accommodation range. For example, if a user has a 70% of a normal accommodation range, lens 22 may provide the remaining 30% accommodation to keep objects in focus. If a user has no accommodation range, lens 22 may provide 100% of the accommodation. If a user has 100% of a normal accommodation range, lens 22 may provide no accommodation or may provide a small amount of accommodation, if desired.

Figure 8:
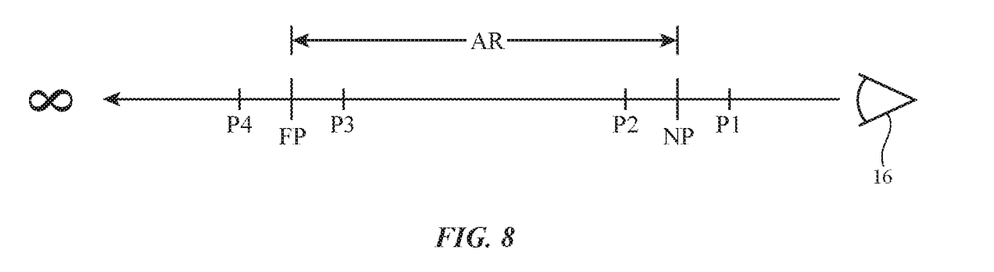
FIG. 8 is a diagram illustrating how a vision characterization process may be used to determine a user's accommodation range in accordance with an embodiment.

FIG. 8 is a diagram illustrating how an accommodation range may be determined during vision characterization operations. Using a similar setup to the arrangement described in connection with FIG. 4, user 16 may view object 18 through lens 22. Control circuitry 26 may cycle lens 22 through different ranges of optical powers to determine the user's near point NP and far point FP. For example, to determine a user's near point NP, control circuitry 26 may cycle through a first range of optical powers corresponding to a first range of focal distances (e.g., between focal distance P1 and focal distance P2). When the user provides input indicating that object 18 comes into focus or goes out of focus, the optical power of lens 22 at that time may be used to solve for $_{DISTANCE}$ in equation 36 of FIG. 3, which corresponds to the user's near point NP. To determine a user's far point FP, control circuitry 26 may cycle through a second range of optical powers corresponding to a second range of focal distances (e.g., between focal distance P3 and focal distance P4). When the user provides input indicating that object 18 comes into focus or goes out of focus, the optical power of lens 22 at that time may be used to solve for $_{DISTANCE}$ in equation 36 of FIG. 3, which corresponds to the user's far point FP.

The optical power adjustment of lens 22 may be performed automatically by control circuitry 26 (e.g., without requiring user input) or may be performed by control circuitry 26 in response to user input to device 18 and/or glasses 14 (e.g., touch input, voice input, motion input, button press input, input of the type described in connection with FIGS. 5, 6, and 7, or any other suitable type of user input).

The distance between the user's near point NP and far point FP corresponds to the user's accommodation range AR. Once control circuitry 26 knows accommodation range AR, control circuitry 26 may control lens 22 based on the user's accommodation range (e.g., to provide an appropriate amount of accommodation based on the user's accommodation range).

Adjusting the optical power of lens 22 to determine the user's accommodation range is merely illustrative. If desired, optical power of lens 22 may remain unchanged, and near point NP and far point FP may be determined by measuring the distance to the nearest object in focus for the user and the farthest object in focus for the user. In this type of arrangement, control circuitry 26 may determine the near point NP by receiving user input indicating that the user is looking at the closest object 18 in focus (e.g., whether object 18 is an electronic device or an object without electronics). Control circuitry 26 may determine the far point FP by receiving user input indicating that the user is looking at the farthest object 18 in focus (e.g., whether object 18 is an electronic device or an object without electronics). This may be achieved by the user looking at different objects 18 at different distances, or may be achieved by the user looking at the same object 18 and moving the object to different distances.

Figure 9:
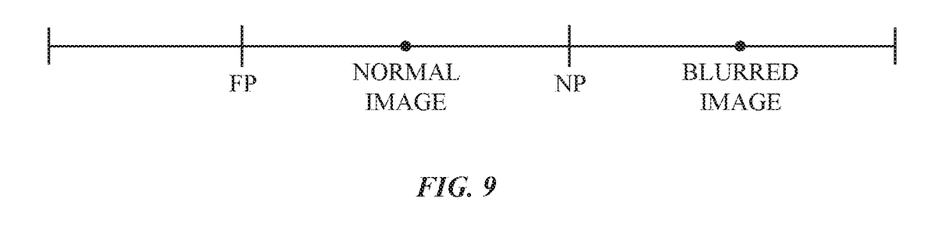
FIG. 9 is a diagram illustrating how eyeglasses may bring an object out of focus to check whether a user's prescription and accommodation range have been accurately determined in accordance with an embodiment.

If desired, control circuitry 26 may perform a check to ensure that the prescription and accommodation range determined for a user are accurate. This type of check is illustrated in FIG. 9.

After determining a user's prescription and accommodation range, a user may view object 18 (e.g., an image on display 32 of electronic device 18 or other suitable object) through lens 22. Initially, control circuitry 26 may set the optical power of lens 22 so that the image on display 32 is in focus for the user, using the prescription and accommodation information gathered during vision characterization operations. As shown in FIG. 9, the "normal image" is located at a distance between the near point NP and far point FP of the user's accommodation range, as determined using a process of the type described in connection with FIG. 8. Control circuitry 26 may then adjust the optical power of lens 22 so that the image on display 32 is outside of the user's accommodation range. As shown in FIG. 9, the "blurred image" is located outside of the user's accommodation range. If the blurred image does not actually appear blurry to the user, the accommodation range determined by control circuitry 26 may not be accurate. If the blurred image does in fact appear blurry to the user, then control circuitry 26 may conclude that the determined accommodation range is accurate. A user may provide input to device 18 and/or glasses 14 to indicate whether the blurred image is in focus or not so that control circuitry 26 can assess the accuracy of the determined accommodation range. If desired, vision characterization operations may be repeated to ensure that the user's prescription and/or accommodation range are accurately determined.

If desired, control circuitry 28 may intentionally blur an image on display 32 of electronic device 18 to check the validity of the prescription. If a user's prescription has been determined incorrectly, the user may not notice that the resolution of the image has been reduced. On the other hand, if a user's prescription has been determined correctly, the user may notice that the image is blurry and may provide appropriate input to electronic device 18 or glasses 14.

Instead of or in addition to blurring images on display 32, control circuitry 28 may display text of varying size on display 32 to measure the user's visual acuity and determine whether glasses 14 are focusing appropriately for the user. The size of the text on display 32 may be varied based on the distance between the user and display 32. Control circuitry 28 may use input-output devices 30 to provide the user with instructions during vision characterization operations and to receive input from the user. For example, a speaker in device 18 may instruct the user to read the text on display 32, and a microphone in device 18 may listen for the user's response. As the text on display 32 gets smaller, the user may indicate when he or she is unable to focus the text accurately. Based on this user input, the distance between the user and display 32, and the size of the text on display 32, control circuitry 28 may be configured to determine whether glasses 14 are appropriately focusing for the user.

Figure 10:
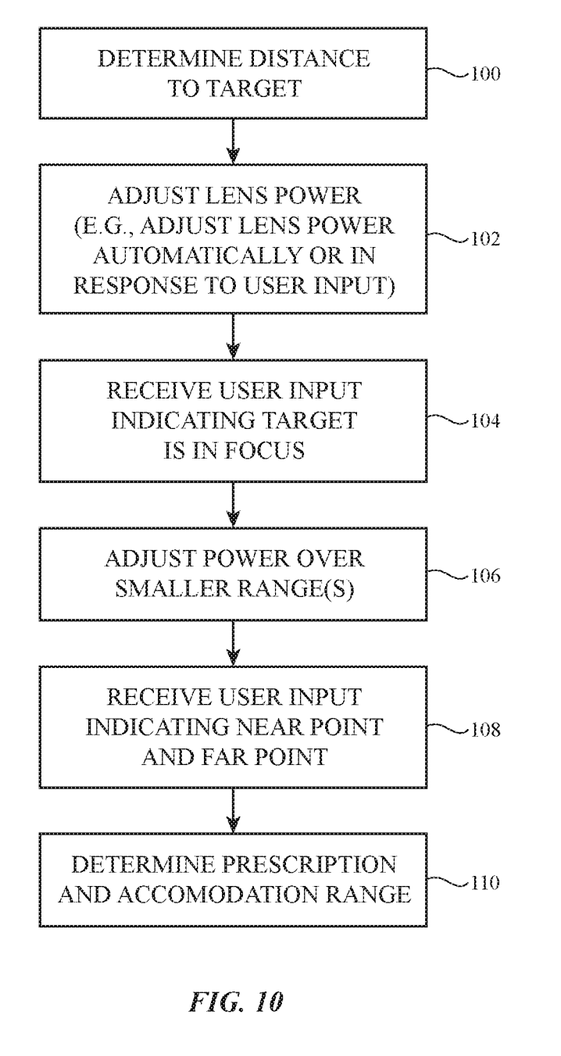
FIG. 10 is a flow chart of illustrative steps involved in determining a user's prescription and accommodation range using optical power adjustment in accordance with an embodiment.
Figure 11:
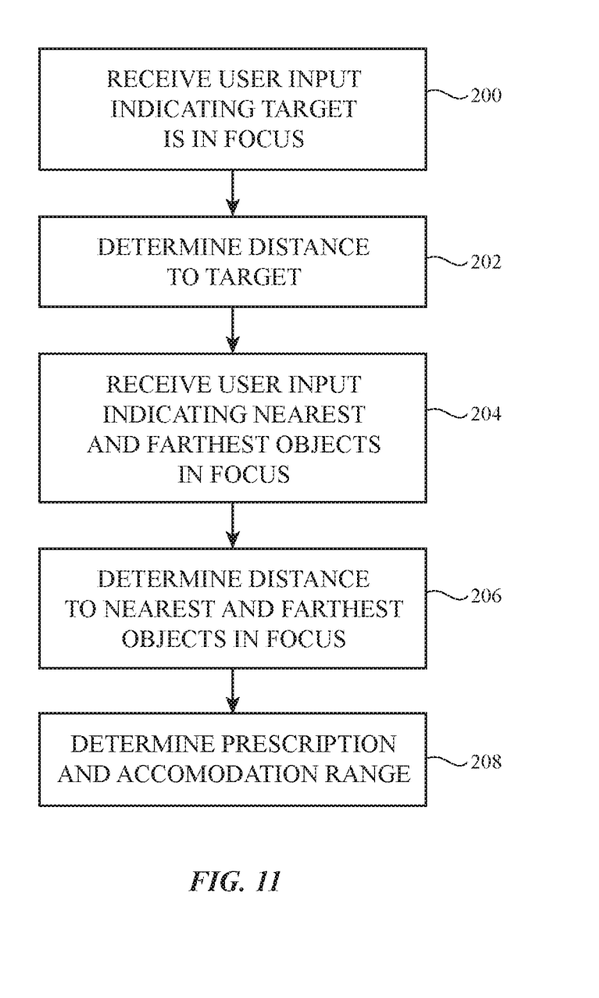
FIG. 11 is a flow chart of illustrative steps involved in determining a user's prescription and accommodation range using distance adjustment in accordance with an embodiment.

As discussed in connection with FIG. 3 and FIG. 8, a user's prescription and accommodation range may be determined by adjusting the optical power of lens 22 (corresponding to $D_{LENS}$ in equation 36 of FIG. 3) and/or by adjusting the distance to in-focus object 18 (corresponding to $D_{DISTANCE}$ in equation 36 of FIG. 3). FIG. 10 is a flow chart of illustrative steps involved in determining a user's prescription and accommodation range via optical power adjustment of lens 22. FIG. 11 is a flow chart of illustrative steps involved in determining a user's prescription and accommodation range via distance adjustment. In both the process of FIG. 10 and the process of FIG. 11, vision characterization operations may be performed using a setup of the type described in connection with FIG. 4. User 16 may view object 18 (sometimes referred to as the target) through lens 22. Object 18 may be an electronic device of the type described in connection with FIG. 2 or object 18 may be an object without electronics.

At step 100, control circuitry 26 of glasses 14 and/or control circuitry 28 may determine the distance to object 18 at which the user is looking. This may include, for example, using inward-facing camera 24 to determine which object 18 the user is looking at, and using distance sensor 20 of glasses 14 and/or a distance sensor in sensors 34 of device 18 to determine the distance 18 to that object. Measuring the distance to object 18 at the beginning of the process of FIG. 10 is merely illustrative. If desired, the distance to object 18 may be measured later in the process (e.g., after step 102, step 104, or step 106).

At step 102, control circuitry 26 may adjust the optical power of lens 22. In some arrangements, the optical power adjustment of lens 22 may be done automatically (e.g., without requiring user input). In other arrangements, optical power adjustment of lens 22 may be done in response to user input (e.g., user input to glasses 14 and/or device 18, such as the user input described in connection with FIGS. 5, 6, and 7).

At step 104, glasses 14 and/or device 18 may receive user input indicating that the target is in focus. The user input may be touch input, voice input, motion input, button press input, or any other suitable type of user input (e.g., input of the type described in connection with FIGS. 5, 6, and 7). The optical power of lens 22 when user 16 indicates that object 18 in focus may correspond to $D_{LENS}$ in equation 36 of FIG. 3, and the distance to the in-focus object 18 corresponds to $D_{DISTANCE}$ in equation 36 of FIG. 3, thus allowing control circuitry 26 to solve for $D_{PRESCRIPTION}$ in equation 36 of FIG. 3.

If desired, step 102 and step 104 may be repeated one or more times to fine tune the prescription measurement. For example, step 102 may include a course adjustment of optical power across a first range of values at a first speed until the user provides a first input at step 104. Processing may then loop back to step 102 to perform a fine adjustment of optical power across a second range of values at a second speed until the user provides a second input at step 104. The second range may be smaller than the first range, and the second speed may be slower than the first speed, if desired.

At step 106, control circuitry 26 may adjust the optical power of lens 22 over smaller ranges for gathering accommodation range information. For example, control circuitry 26 may cycle through a first range of optical powers corresponding to close focal distances (e.g., P1 and P2 of FIG. 9) until user input is received at step 108. Control circuitry 26 may cycle through a second range of optical powers corresponding to far focal (e.g., P3 and P4 of FIG. 9) until user input is received at step 108.

The user input of step 108 may be touch input, voice input, motion input, button press input, or any other suitable type of user input (e.g., input to glasses 14 and/or device 18, input of the type described in connection with FIGS. 5, 6, and 7, etc.). The user input may be used to indicate when object 18 comes into focus or goes out of focus.

At step 110, control circuitry 26 and/or control circuitry 28 may determine the user's prescription and accommodation range based on the information gathered in step 102, 104, 106, and 108. Using the optical power of lens 22 when user 16 indicates that object 18 in focus (corresponding to $D_{LENS}$ in equation 36 of FIG. 3) and the distance to the in-focus object 18 (corresponding to $D_{DISTANCE}$ in equation 36 of FIG. 3), control circuitry 26 may solve for $D_{PRESCRIPTION}$ in equation 36 of FIG. 3. The accommodation range may be determined based on the nearest point in focus for the user and the farthest point in focus for the user.

FIG. 11 is a flow chart of illustrative steps involved in determining a user's prescription and accommodation range via distance adjustment. During the process of FIG. 11, control circuitry 26 may, if desired, maintain the optical power of lens 22 at a known value (corresponding to $D_{LENS}$ in equation 36 of FIG. 3).

At step 200, glasses 14 and/or device 18 may receive user input indicating the object at which the user is looking is in focus. The user input may be touch input, voice input, motion input, button press input, or any other suitable type of user input (e.g., input of the type described in connection with FIGS. 5, 6, and 7, etc.). The user may bring object 18 into focus by moving target 18 back and forth until it is in focus for the user, or the user may simply look around at different objects 18 until the user's gaze finds an object 18 that is in focus.

At step 202, control circuitry 26 of glasses 14 and/or control circuitry 28 may determine the distance to object 18 at which the user is looking. This may include, for example, using inward-facing camera 24 to determine which object 18 the user is looking at, and using distance sensor 20 of glasses 14 and/or a distance sensor in sensors 34 of device 18 to determine the distance to that object.

At step 204, glasses 14 and/or device 18 may receive user input indicating nearest and farthest objects that are in focus for the user. The user input may be touch input, voice input, motion input, button press input, or any other suitable type of user input (e.g., input of the type described in connection with FIGS. 5, 6, and 7, etc.). This may be achieved by having the user move object 18 to the closest and furthest points where object 18 is still focus, or this may be achieved by having the user look around until the user's gaze finds the nearest object in focus and the farthest object in focus.

At step 206, control circuitry 26 of glasses 14 and/or control circuitry 28 may determine the distance to the nearest object 18 in focus and the farthest object 18 in focus. This may include, for example, using inward-facing camera 24 to determine which object 18 the user is looking at, and using distance sensor 20 of glasses 14 and/or a distance sensor in sensors 34 of device 18 to determine the distance to that object.

At step 208, control circuitry 26 and/or control circuitry 28 may determine the user's prescription and accommodation range based on the information gathered in step 200, 202, 204, and 206. Using the set optical power of lens 22 (corresponding to $D_{LENS}$ in equation 36 of FIG. 3) and the distance to the in-focus object 18 (corresponding to $D_{DISTANCE}$ in equation 36 of FIG. 3), control circuitry 26 may solve for $D_{PRESCRIPTION}$ in equation 36 of FIG. 3. The accommodation range may be determined based on the nearest point in focus for the user and the farthest point in focus for the user.

As discussed above, aspects of the present technology include the gathering and use of biometric data such as a user's prescription and accommodation range. The technology also contemplates and/or may be implemented along with technologies that involve gathering personal data that relates to the user's health, that uniquely identifies a specific person, and/or that can be used to contact or locate a specific person. Such personal data can include demographic data, date of birth, location-based data, telephone numbers, email addresses, home addresses, and data or records relating to a user's health or level of fitness (e.g., vital signs measurements, medication information, exercise information).

The present disclosure recognizes that a user's personal data, including biometric data, such as data generated and used by the present technology, can be used to the benefit of users. For example, information about a user's prescription and/or accommodation range may allow glasses 14 to operate effectively for users with different vision capabilities.

The present disclosure contemplates that the entities responsible for the collection, analysis, disclosure, transfer, storage, or other use of such personal data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should require receipt of the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. The policies and practices may be adapted depending on the geographic region and/or the particular type and nature of personal data being collected and used.

Despite the foregoing, the present disclosure also contemplates embodiments in which users selectively block the collection of, use of, or access to, personal data, including biometric data. For example, a user may be able to disable hardware and/or software elements that collect biometric data. Further, the present disclosure contemplates that hardware and/or software elements can be provided to prevent or block access to personal data that has already been collected. Specifically, users can select to remove, disable, or restrict access to certain health-related applications collecting users' personal health or fitness data.

The foregoing is merely illustrative and various modifications can be made to the described embodiments. The foregoing embodiments may be implemented individually or in any combination.

What is claimed is:

1. Eyeglasses configured to be worn by a user, the eyeglasses comprising:
   a distance sensor that measures a distance to an object;
   a lens that aligns with a respective one of the user's eyes; and
   control circuitry configured to:
      gather user input;
      adjust an optical power of the lens; and
      determine the user's prescription and accommodation range based at least partly on the user input, the optical power, and the distance, wherein the control circuitry cycles through first and second ranges of optical powers, wherein the user input includes a first user input indicating a first optical power in the first range that brings the object into focus for the user and a second user input indicating a second optical power in the second range that brings the object into focus for the user, and wherein the control circuitry determines the accommodation range based on the first and second optical powers.

2. The eyeglasses defined in claim 1, wherein the user input indicates whether the object is in focus for the user.

3. The eyeglasses defined in claim 2, wherein the control circuitry is configured to automatically cycle through a range of optical powers until the user input indicates that the object is in focus for the user.

4. The eyeglasses defined in claim 1, wherein the control circuitry adjusts the optical power of the lens in response to the user input.

5. The eyeglasses defined in claim 1, wherein the object comprises an electronic device that receives the user input from the user, the eyeglasses further comprising:
wireless communications circuitry that receives signals associated with the user input from the electronic device, wherein the control circuitry is configured to gather the user input from the wireless communications circuitry.

6. The eyeglasses defined in claim 1, further comprising an input device that receives the user input from the user, wherein the control circuitry is configured to gather the user input from the input device.

7. The eyeglasses defined in claim 1, wherein the lens comprises a voltage-modulated optical material.

8. The eyeglasses defined in claim 7, wherein the voltage-modulated optical material comprises liquid crystal material.

9. The eyeglasses defined in claim 1, further comprising an eye tracking camera that tracks the user's gaze, wherein control circuitry determines that the object is within the user's gaze using the eye tracking camera, and wherein the distance sensor measures the distance to the object after the control circuitry determines that the object is within the user's gaze.

10. An electronic device configured to communicate wirelessly with eyeglasses, wherein the eyeglasses are configured to be worn by a user, wherein the eyeglasses comprise a lens having an adjustable optical power, and wherein the eyeglasses and the electronic device are separated by a distance, the electronic device comprising:
an input device that receives user input, wherein the input device comprises a rotatable watch crown;
wireless communications circuitry that transmits wireless signals associated with the user input to the eyeglasses to adjust the optical power of the lens; and
control circuitry that determines a user's prescription based on the user input, the optical power of the lens, and the distance.

11. The electronic device defined in claim 10, wherein rotation of the watch crown in a first direction results in an increase in the optical power of the lens and rotation of the watch crown in a second direction results in a decrease in the optical power of the lens.

12. The electronic device defined in claim 11, wherein a speed at which the watch crown is rotated controls a speed at which the optical power of the lens is adjusted.

13. An electronic device configured to communicate wirelessly with eyeglasses, wherein the eyeglasses are configured to be worn by a user, wherein the eyeglasses comprise a lens having an adjustable optical power, and wherein the eyeglasses and the electronic device are separated by a distance, the electronic device comprising:
an input device that receives user input;
a display that displays an image that is viewed by the user through the lens, wherein the user input indicates whether the image is in focus for the user;
wireless communications circuitry that transmits wireless signals associated with the user input to the eyeglasses to adjust the optical power of the lens; and
control circuitry that determines a user's prescription based on the user input, the optical power of the lens, and the distance, wherein the control circuitry reduces a resolution of the image until the user input indicates that the image is out of focus.

14. The electronic device defined in claim 13, wherein the display displays user interface face elements, wherein the input device comprises a touch sensor, and wherein the user input comprises touch input that controls the user interface elements to adjust the optical power of the lens.

15. A method for determining a user's prescription using eyeglasses and an electronic device, wherein the eyeglasses are configured to be worn by a user and wherein the eyeglasses comprise a lens, control circuitry that adjusts an optical power of the lens, and wireless communications circuitry that communicates with the electronic device, the method comprising:
with the wireless control circuitry, receiving first and second signals associated with first and second user inputs received by the electronic device;
with the control circuitry, adjusting the optical power of the lens in response to the first signal associated with the first user input;
with a distance sensor, measuring a distance between the electronic device and the eyeglasses in response to the second signal associated with the second user input; and
with the control circuitry, determining the user's prescription based on the optical power of the lens and the distance.

16. The method defined in claim 15 wherein the electronic device comprises a display that displays an image, wherein the user views the image through the lens, and wherein the second user input indicates whether the image is in focus for the user.

17. The method defined in claim 16 wherein the lens comprises liquid crystal material and wherein the control circuitry adjusts the optical power of the lens by applying an electric field across the liquid crystal material.

* * * * *